United States Patent
Kaneno et al.

(10) Patent No.: US 9,447,485 B2
(45) Date of Patent: Sep. 20, 2016

(54) NI₃(SI, TI)-BASED INTERMETALLIC COMPOUND TO WHICH TA IS ADDED

(75) Inventors: Yasuyuki Kaneno, Sakai (JP); Takayuki Takasugi, Sakai (JP)

(73) Assignee: OSAKA PREFECTURE UNIVERSITY PUBLIC CORPORATION, Osaka (JP)

(*) Notice: Subject to any disclaimer, the term of this patent is extended or adjusted under 35 U.S.C. 154(b) by 1164 days.

(21) Appl. No.: 13/395,778

(22) PCT Filed: Sep. 14, 2010

(86) PCT No.: PCT/JP2010/065839
§ 371 (c)(1),
(2), (4) Date: Mar. 23, 2012

(87) PCT Pub. No.: WO2011/030905
PCT Pub. Date: Mar. 17, 2011

(65) Prior Publication Data
US 2012/0171071 A1 Jul. 5, 2012

(30) Foreign Application Priority Data
Sep. 14, 2009 (JP) .................... 2009-212090

(51) Int. Cl.
C22C 19/03 (2006.01)
C22C 1/00 (2006.01)
C22F 1/08 (2006.01)

(52) U.S. Cl.
CPC .............. *C22C 19/03* (2013.01); *C22C 1/00* (2013.01); *C22F 1/08* (2013.01)

(58) Field of Classification Search
CPC ................................. C22C 19/03; C22F 1/10

USPC .................. 420/441; 148/426, 675; 428/544
See application file for complete search history.

(56) References Cited

FOREIGN PATENT DOCUMENTS

| JP | 4-246144 A | | 9/1992 |
|---|---|---|---|
| JP | 4-268037 A | | 9/1992 |
| JP | 04268037 A | * | 9/1992 |
| JP | 5-320793 A | | 12/1993 |
| JP | 5-320794 A | | 12/1993 |

(Continued)

OTHER PUBLICATIONS

Takasugi et al, "The effect of Nb addition on microstructure and mechanical properties of Ni3(Si, Ti) alloy", Journal of Materials Science, vol. 36, (2001), pp. 643-651.

(Continued)

*Primary Examiner* — Matthew E Hoban
*Assistant Examiner* — Anthony Liang
(74) *Attorney, Agent, or Firm* — Birch, Stewart, Kolasch & Birch, LLP

(57) ABSTRACT

The present invention provides a structural material having excellent hardness (strength) characteristics.
The present invention provides an Ni₃(Si, Ti)-based intermetallic compound characterized by containing from 25 to 500 ppm by weight of B with respect to a weight of an intermetallic compound having a composition of 100% by atom in total consisting of from 10.0 to 12.0% by atom of Si, 1.5% by atom or more but less than 7.5% by atom of Ti, more than 2.0% by atom but 8.0% by atom or less of Ta and a balance made up of Ni excepting impurities, and by having a microstructure composed of an L1₂ phase or a microstructure composed of an L1₂ phase and a second phase dispersion containing Ni and Ta.

20 Claims, 16 Drawing Sheets

(56) References Cited

FOREIGN PATENT DOCUMENTS

| JP | 6-33174 A | 2/1994 |
| JP | 8-60278 A | 3/1996 |
| JP | 2010-31323 A | 2/2010 |

OTHER PUBLICATIONS

Nakamura et al., "The effect of second-phase Ni solid solution on environmental embrittlement of L1 2-type Ni 3(Si, Ti) ordered alloys", Materials Science and Engineering A 383 (2004) 259-270.

PCT/ISA/210—International Search Report dated Dec. 14, 2010, issued in PCT/JP2010/065839.

T. Takasugi et al., "Mechanical Properties of recrystallized L1 2-type Ni 3(Si, Ti) intermetallics", Journal of Materials Science 26, pp. 1173-1178 (1991).

Takasugi et al., "Strengthening and Ductilization of Ni3Si by the Addition of Ti Elements", Acta Metall. Mater., vol. 38, No. 5 (1990) pp. 747-755.

* cited by examiner

$Ni_3(Si, Ti)$-BASED INTERMETALLIC COMPOUND TO WHICH TA IS ADDED

TECHNICAL FIELD

The present invention relates to a nickel intermetallic compound to which Ta is added, and more particularly to an intermetallic compound based on a composition of $Ni_3(Si, Ti)$ (hereinafter, referred to as "$Ni_3(Si, Ti)$-based intermetallic compound").

BACKGROUND ART $Ni_3Si$ intermetallic compounds, which are nickel intermetallic compounds, have excellent characteristics such as high-temperature strength, corrosion resistance and oxidation resistance. However, the $Ni_3Si$ intermetallic compounds are prone to intergranular fracture, and therefore an intermetallic compound allowing easier plastic working at room temperature has been desired. To this end, research and development for improving the $Ni_3Si$ intermetallic compounds has been promoted. For example, an $Ni_3(Si, Ti)$-based intermetallic compound, which is a nickel intermetallic compound, is known as an intermetallic compound having workability, in particular, ductility at room temperature (see Non-Patent Documents 1 and 2, for example).

As such an $Ni_3(Si, Ti)$-based intermetallic compound, for example, an intermetallic compound containing one or both of Hf and Zr in addition to Ni, Si, Ti and C as a casting nickel intermetallic compound is known, and it is known that the intermetallic compound has good castability as a watch side material and the like (suitable for die casting process and lost-wax process) (see Patent Document 1, for example).

In addition, an intermetallic compound containing Ni, Si, Ti, Cu, Ta and B is known as an $Ni_3(Si, Ti)$-based alloy material having totally satisfying ductility and workability as a structural material as well as excellent corrosion resistance (see Patent Document 2, for example). The intermetallic compound can ensure the satisfactory ductility because of addition of a combination of Ta and Cu to be useful as a structural material for a sulfuric acid refinery and the like.

RELATED ART DOCUMENTS

Patent Documents

Patent Document 1: Japanese Unexamined Patent Publication No. HEI 5(1993)-320793
Patent Document 2: Japanese Unexamined Patent Publication No. HEI 5(1993)-320794
Patent Document 3: Japanese Unexamined Patent Publication No. HEI 4(1992)-268037
Patent Document 4: Japanese Unexamined Patent Publication No. HEI 6(1994)-33174
Patent Document 5: Japanese Unexamined Patent Publication No. HEI 4(1992)-246144

Non-Patent Documents

Non-Patent Document 1: T. Takasugi et al., Journal of Materials Science 26, pp. 1173-1178 (1991)
Non-Patent Document 2: T. Nakamura et al., Materials Science and Engineering A 383 (2004) 259-270

SUMMARY OF THE INVENTION

Problems to be Solved by the Invention

However, these nickel intermetallic compounds are desired to be more enhanced in mechanical and chemical characteristics when used as structural materials. When a structure formed of a nickel intermetallic compound is produced through plastic working as well as precision casting, for example, enhancement in workability including ductility is desired. In addition, when a nickel intermetallic compound is used for an apparatus handling an acid, maintenance of chemical characteristics is also desired. Thus, a nickel intermetallic compound having sufficient chemical characteristics and mechanical characteristics (ductility, for example) has been desired. In addition, in the case of a structural material of a machine element that is used at high temperatures, a material has been desired which has more enhanced hardness (strength) characteristics than the above-described $Ni_3(Si, Ti)$-based intermetallic compound while maintaining comparable ductility to the above-described $Ni_3(Si, Ti)$-based intermetallic compound. Furthermore, in the case of a structural material of a frictional part, a material having excellent wear resistance has been desired.

In view of the above-described circumstances, the present invention has been achieved to provide a nickel intermetallic compound having sufficient chemical characteristics and mechanical characteristics. The present invention also provides a structural material having excellent hardness (strength) characteristics and further provides a structural material having excellent wear resistance.

Means for Solving the Problems

The present invention provides an $Ni_3(Si, Ti)$-based intermetallic compound characterized by containing from 25 to 500 ppm by weight of B with respect to a weight of an intermetallic compound having a composition of 100% by atom in total consisting of from 10.0 to 12.0% by atom of Si, 1.5% by atom or more but less than 7.5% by atom of Ti, more than 2.0% by atom but 8.0% by atom or less of Ta and a balance made up of Ni excepting impurities, and by having a microstructure composed of an $L1_2$ phase or a microstructure composed of an $L1_2$ phase and a second phase dispersion containing Ni and Ta.

Effects of the Invention

The inventors of the present invention have originated addition of a high melting point metal element in place of Ti in $Ni_3(Si, Ti)$ in view of the fact that Ti in $Ni_3(Si, Ti)$ is a factor of deterioration in oxidation resistance, and made intensive studies on the idea. As a result, the inventors of the present invention have found that an $Ni_3(Si, Ti)$-based intermetallic compound containing Ta in addition to Ni, Si, Ti and B has superior hardness (strength) to an intermetallic compound composed of Ni, Si and Ti to reach completion of the present invention. The $Ni_3(Si, Ti)$-based intermetallic compound of the present invention can be suitably used for structural materials such as machine elements as having excellent hardness (strength).

Hereinafter, an embodiment of the present invention will be described. Configurations shown in the following descriptions are merely exemplifications and the scope of the present invention is not limited thereto. In this specification, "from A to B" means that numerical values A and B are included in the range.

MODE FOR CARRYING OUT THE INVENTION

Figure 1:
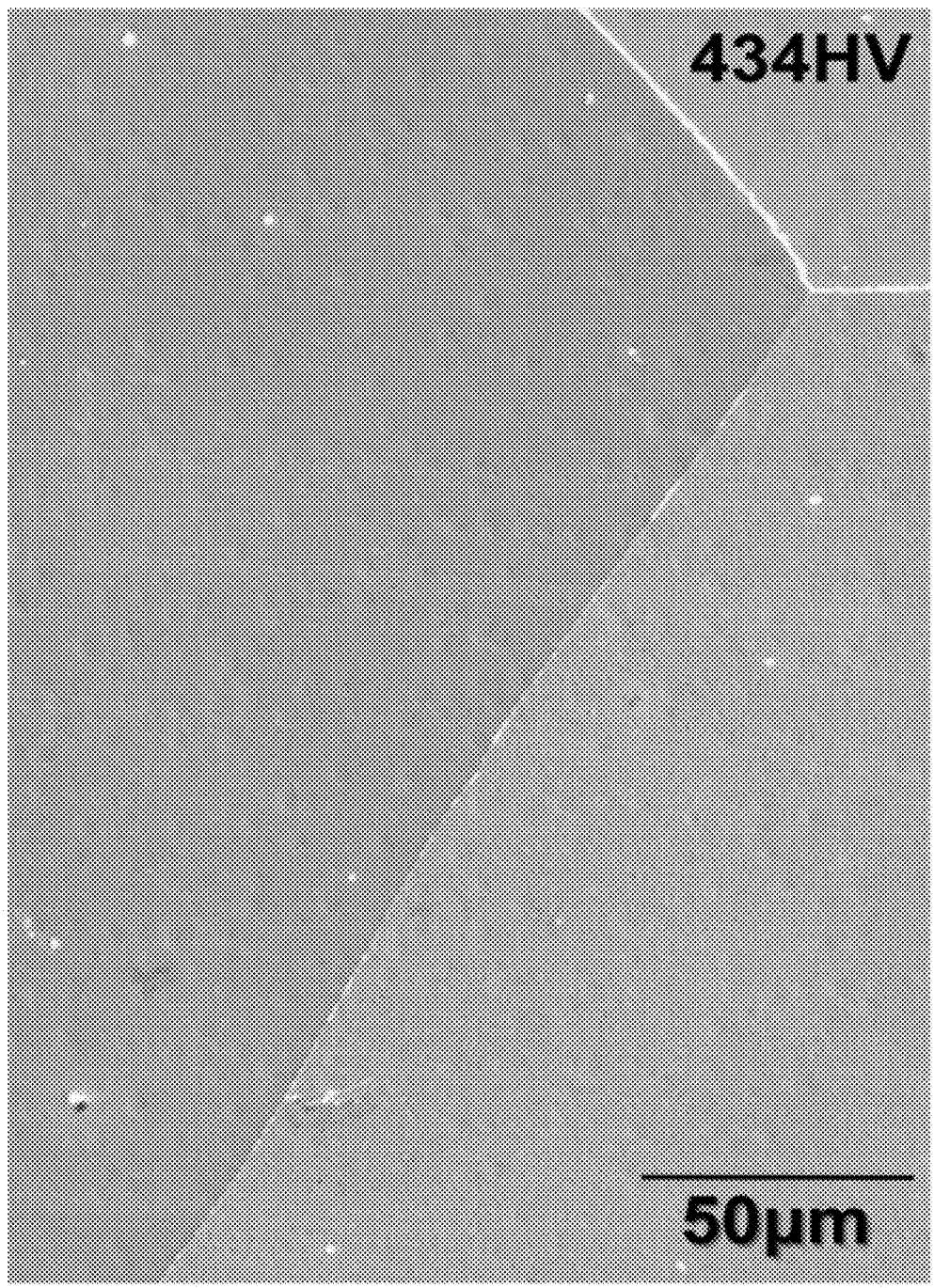
FIG. 1 is an SEM photograph of Example Sample 2.

According to an aspect, an $Ni_3(Si, Ti)$-based intermetallic compound of the present invention is characterized by containing an intermetallic compound having a composition of 100% by atom in total consisting of Ni as a main component, from 7.5 to 12.5% by atom of Si, from 1.5 to 10.5% by atom of Ti and from 1.0 to 10.0% by atom of Ta, and from 25 to 500 ppm by weight of B with respect to the weight of the intermetallic compound.

According to the present invention, an $Ni_3(Si, Ti)$-based intermetallic compound having excellent hardness (strength) is provided.

In an embodiment of the present invention, in addition to the configuration of the present invention, the $Ni_3(Si, Ti)$-based intermetallic compound may have a Vickers' hardness of from 410 to 520 in a range of temperature from room temperature to 800° C. Here, the Vickers' hardness is measured under a load of 300 g, 500 g or 1 kg.

In an embodiment of the present invention, the $Ni_3(Si, Ti)$-based intermetallic compound may contain an intermetallic compound having a composition of 100% by atom in total consisting of Ni as a main component, from 10.0 to 12.0% by atom of Si, from 1.5 to 9.5% by atom of Ti and from 1.0 to 9.0% by atom of Ta, and from 25 to 100 ppm by weight of B with respect to the weight of the intermetallic compound. Alternatively, the $Ni_3(Si, Ti)$-based intermetallic compound may contain an intermetallic compound having a composition of 100% by atom in total consisting of Ni as a main component, from 10.0 to 12.0% by atom of Si, from 2.5 to 8.5% by atom of Ti and from 1.0 to 7.0% by atom of Ta, and from 25 to 100 ppm by weight of B with respect to the weight of the intermetallic compound.

In an embodiment of the present invention, the $Ni_3(Si, Ti)$-based intermetallic compound may contain an intermetallic compound having a composition of 100% by atom in total consisting of Ni as a main component, from 10.0 to 12.0% by atom of Si, from 2.5 to 6.5% by atom of Ti and from 3.0 to 7.0% by atom of Ta, and from 25 to 100 ppm by weight of B with respect to the weight of the intermetallic compound.

Furthermore, in an embodiment of the present invention, the $Ni_3(Si, Ti)$-based intermetallic compound may contain an intermetallic compound having a composition of 100% by atom in total consisting of Ni as a main component, from 10.0 to 12.0% by atom of Si and from 9.0 to 11.5% by atom in total of Ti and Ta, and from 25 to 100 ppm by weight of B with respect to the weight of the intermetallic compound.

According to another aspect, the $Ni_3(Si, Ti)$-based intermetallic compound of the present invention is characterized by containing an intermetallic compound having a composition of 100% by atom in total consisting of from 10.0 to 12.0% by atom of Si, 1.5% by atom or more but less than 7.5% by atom of Ti, more than 2.0% by atom but 8.0% by atom or less of Ta and a balance made up of Ni excepting impurities; and from 25 to 500 ppm by weight of B with respect to the weight of the intermetallic compound, and by having a microstructure composed of an $L1_2$ phase or a microstructure composed of an $L1_2$ phase and a second phase dispersion containing Ni and Ta.

According to the present invention, an $Ni_3(Si, Ti)$-based intermetallic compound having wear resistance and excellent hardness (strength) is provided.

The present invention may be an $Ni_3(Si, Ti)$-based intermetallic compound for frictional parts, the $Ni_3(Si, Ti)$-based intermetallic compound containing an intermetallic compound having a composition of 100% by atom in total consisting of from 10.0 to 12.0% by atom of Si, 1.5% by atom or more but less than 7.5% by atom of Ti, more than 2.0% by atom but 8.0% by atom or less of Ta and a balance made up of Ni excepting impurities; and from 25 to 500 ppm by weight of B with respect to the weight of the intermetallic compound, and having a microstructure composed of an $L1_2$ phase or a microstructure composed of an $L1_2$ phase and a second phase dispersion containing Ni and Ta. In addition, the present invention may be use of the $Ni_3(Si, Ti)$-based intermetallic compound having the above-described composition and microstructure as a frictional part material (or wear-resistant metallic material). In addition, the present invention may be a method for forming a frictional part by melting and casting the material having the above-described composition. Alternatively, the present invention may be a method for forming a frictional part with an $Ni_3(Si, Ti)$-based intermetallic compound obtained by casting. For example, the frictional part is formed by cutting the cast $Ni_3(Si, Ti)$-based intermetallic compound.

In an embodiment of the present invention, the $Ni_3(Si, Ti)$-based intermetallic compound may contain an intermetallic compound having a composition of 100% by atom in total consisting of from 10.0 to 12.0% by atom of Si, from 1.5 to 5.5% by atom of Ti, from 4.0 to 8.0% by atom of Ta and a balance made up of Ni excepting impurities, and from 25 to 100 ppm by weight of B with respect to the weight of the intermetallic compound. Alternatively, the $Ni_3(Si, Ti)$-based intermetallic compound may contain an intermetallic compound having a composition of 100% by atom in total consisting of from 10.0 to 12.0% by atom of Si, from 2.5 to 5.5% by atom of Ti, from 4.0 to 7.0% by atom of Ta and a balance made up of Ni excepting impurities, and from 25 to 100 ppm by weight of B with respect to the weight of the intermetallic compound.

According to these embodiments, an $Ni_3(Si, Ti)$-based intermetallic compound having enhanced hardness and enhanced wear resistance is provided.

In an embodiment of the present invention, the $Ni_3(Si, Ti)$-based intermetallic compound may contain an intermetallic compound having a composition of 100% by atom in total consisting of from 10.0 to 12.0% by atom of Si, from 2.5 to 6.5% by atom of Ti, from 3.0 to 7.0% by atom of Ta and a balance made up of Ni excepting impurities; and from 25 to 100 ppm by weight of B with respect to the weight of the intermetallic compound, and have a microstructure composed of an $L1_2$ phase or a microstructure composed of an $L1_2$ phase and a second phase dispersion containing Ni and Ta. Alternatively, the $Ni_3(Si, Ti)$-based intermetallic compound may contain an intermetallic compound having a composition of 100% by atom in total consisting of from 10.0 to 12.0% by atom of Si, from 9.0 to 11.5% by atom in total of Ti and Ta, and a balance made up of Ni excepting impurities; and from 25 to 100 ppm by weight of B with respect to the weight of the intermetallic compound. In addition, the $Ni_3(Si, Ti)$-based intermetallic compound may have a Vickers' hardness of from 410 to 520 when measured under a load of 300 g, 500 g or 1 kg. In this case, the measurement for the Vickers' hardness may be performed at room temperature (approximately 25° C.).

According to these embodiment, an $Ni_3(Si, Ti)$-based intermetallic compound having enhanced hardness is provided.

According to still another aspect, the $Ni_3(Si, Ti)$-based intermetallic compound of the present invention is characterized by containing an intermetallic compound having a composition of 100% by atom in total consisting of from 10.0 to 12.0% by atom of Si, 1.5% by atom or more but less than 7.5% by atom of Ti, more than 2.0% by atom but 8.0% by atom or less of Ta and a balance made up of Ni excepting impurities; and from 25 to 500 ppm by weight of B with respect to the weight of the intermetallic compound, and by having a microstructure composed of an $L1_2$ phase or a microstructure composed of an $L1_2$ phase and a second phase dispersion containing Ni and Ta, wherein the maximum content of Ta is 6.0% by atom.

According to the present invention, an $Ni_3(Si, Ti)$-based intermetallic compound having excellent ductility or oxidation resistance characteristics is provided.

In an embodiment of the present invention, the $Ni_3(Si, Ti)$-based intermetallic compound may contain an intermetallic compound having a composition of 100% by atom in total consisting of from 19.0 to 21.5% by atom in total of Si, Ti and Ta, and a balance made up of Ni excepting impurities; and from 25 to 500 ppm by weight of B with respect to the weight of the intermetallic compound.

According to such an embodiment, the content of Ni is approximately from 78.5 to 81.0% by atom to form a microstructure substantially consisting only of an $L1_2$ phase or a microstructure substantially consisting only of an $L1_2$ phase and a second phase dispersion containing Ni and Ta. Accordingly, wear resistance and ductility or oxidation resistance characteristics as well as hardness are excellent.

Hereinafter, each element in these embodiments will be described in detail. In this specification, "from A to B" means that numerical values A and B are included in the range, unless otherwise stated.

The content of Ni is, for example, from 78.5 to 81.0% by atom, and preferably from 78.5 to 80.5% by atom. Specific examples of the content of Ni include 78.5, 79.0, 79.5, 80.0, 80.5 and 81.0% by atom. The content of Ni may be between any two of the numeral values exemplified here.

The content of Si is from 7.5 to 12.5% by atom, and preferably from 10.0 to 12.0% by atom. Specific examples of the content of Si include 7.5, 8.0, 8.5, 9.0, 9.5, 10.0, 10.5, 11.0, 11.5, 12.0 and 12.5% by atom. The content of Si may be between any two of the numeral values exemplified here.

The content of Ti is from 1.5 to 10.5% by atom, and preferably from 1.5 to 9.5% by atom. More preferably, the content of Ti is from 2.5 to 6.5% by atom. Specific examples of the content of Ti include 1.5, 2.0, 2.5, 3.0, 3.5, 4.0, 4.5, 5.0, 5.5, 6.0, 6.5, 7.0, 7.5, 8.0, 8.5, 9.0, 9.5, 10.0 and 10.5% by atom. The content of Ti may be between any two of the numeral values exemplified here.

In terms of hardness and wear resistance, the content of Ti is preferably 1.5% by atom or more but less than 7.5% by atom, more preferably from 1.5 to 5.5% by atom, and still more preferably from 2.5 to 5.5% by atom. The content of Ti in these ranges enhances hardness and wear resistance.

The content of Ta is from 1.0 to 10.0% by atom, and preferably from 1.0 to 9.0% by atom. More preferably, the content of Ta is from 3.0 to 7.0% by atom. Specific examples of the content of Ta include 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 and 10.0% by atom. The content of Ta may be between any two of the numeral values exemplified here.

In terms of hardness and wear resistance, the content of Ta is preferably more than 2.0% by atom but 8.0% by atom or less, more preferably from 4.0 to 8.0% by atom, and still more preferably from 4.0 to 7.0% by atom. The content of Ta in these ranges enhances hardness and wear resistance.

In addition, the total content of Ti and Ta may be from 9.0 to 11.5% by atom. For example, the total content of Ti and Ta is 9.0, 9.5, 10.0, 10.5, 11.0 or 11.5% by atom. The content of Ti and Ta may be between any two of the numeral values exemplified here.

In addition, the total content of Si, Ti and Ta is from 19.0 to 21.5% by atom, and more preferably from 19.5 to 21.5% by atom.

The content of each element is adjusted appropriately so that the total content of Ni, Si, Ti and Ta is 100% by atom.

The content of B is from 25 to 500 ppm by weight, and preferably from 25 to 100 ppm by weight. Specific examples of the content of B include 25, 40, 50, 60, 75, 100, 150, 200, 300, 400 and 500 ppm by weight. The content of B may be between any two of the numeral values exemplified here.

According to an embodiment of the present invention, specific compositions of the intermetallic compound are obtained by adding the above-mentioned content of B to the compositions shown in Tables 1-3, for example.

TABLE 1

| Ni at % | Si at % | Ti at % | Ta at % |
|---|---|---|---|
| 78.5 | 10.5 | 7.5 | 3.5 |
| 78.5 | 10.5 | 6.0 | 5.0 |
| 78.5 | 10.5 | 4.5 | 6.5 |
| 78.5 | 11.5 | 9.0 | 1.0 |

TABLE 1-continued

| Ni at % | Si at % | Ti at % | Ta at % |
|---|---|---|---|
| 78.5 | 11.5 | 8.0 | 2.0 |
| 78.5 | 11.5 | 7.0 | 3.0 |
| 78.5 | 11.5 | 6.0 | 4.0 |
| 78.5 | 11.5 | 5.0 | 5.0 |
| 78.5 | 11.5 | 4.0 | 6.0 |
| 78.5 | 11.5 | 3.0 | 7.0 |
| 78.5 | 12.5 | 7.5 | 1.5 |
| 78.5 | 12.5 | 6.0 | 3.0 |
| 78.5 | 12.5 | 4.5 | 4.5 |

TABLE 2

| Ni at % | Si at % | Ti at % | Ta at % |
|---|---|---|---|
| 79.5 | 9.5 | 7.5 | 3.5 |
| 79.5 | 9.5 | 6.0 | 5.0 |
| 79.5 | 9.5 | 4.5 | 6.5 |
| 79.5 | 11.0 | 8.5 | 1.0 |
| 79.5 | 11.0 | 7.5 | 2.0 |
| 79.5 | 11.0 | 6.5 | 3.0 |
| 79.5 | 11.0 | 5.5 | 4.0 |
| 79.5 | 11.0 | 4.5 | 5.0 |
| 79.5 | 11.0 | 3.5 | 6.0 |
| 79.5 | 11.0 | 2.5 | 7.0 |
| 79.5 | 11.5 | 7.0 | 2.0 |
| 79.5 | 11.5 | 6.0 | 3.0 |
| 79.5 | 11.5 | 5.5 | 3.5 |

TABLE 3

| Ni at % | Si at % | Ti at % | Ta at % |
|---|---|---|---|
| 81.0 | 8.0 | 7.5 | 3.5 |
| 81.0 | 8.0 | 6.0 | 5.0 |
| 81.0 | 8.0 | 7.5 | 3.5 |
| 81.0 | 9.5 | 8.5 | 1.0 |
| 81.0 | 9.5 | 7.5 | 2.0 |
| 81.0 | 9.5 | 6.5 | 3.0 |
| 81.0 | 9.5 | 5.5 | 4.0 |
| 81.0 | 9.5 | 4.5 | 5.0 |
| 81.0 | 9.5 | 3.5 | 6.0 |
| 81.0 | 9.5 | 2.5 | 7.0 |
| 81.0 | 10.0 | 7.5 | 1.5 |
| 81.0 | 10.0 | 6.5 | 2.5 |
| 81.0 | 10.0 | 5.5 | 3.5 |

The $Ni_3(Si, Ti)$-based intermetallic compound according to the embodiment may substantially consist of the elements, that is, Ni, Si, Ti, B and Ta or contain an impurity element other than the elements. For example, the $Ni_3(Si, Ti)$-based intermetallic compound may substantially consist only of the elements, that is, Ni, Si, Ti, B and Ta, containing an inevitable impurity as the impurity element.

An $Ni_3(Si, Ti)$-based intermetallic compound according to an embodiment of the present invention can be obtained by melting the metals, that is, Ni, Si, Ti and Ta at proportions mentioned in the embodiments by heating, and casting the resulting molten metal by cooling. The $Ni_3(Si, Ti)$-based intermetallic compound obtained through the solidification may be given homogenization heat treatment. The homogenization heat treatment renders the elements free from segregation, so that the microstructure can be uniform.

In addition, the $Ni_3(Si, Ti)$-based intermetallic compound according to this embodiment may have a Vickers' hardness of from 410 to 520 when measured under a load of 300 g. According to the embodiment of the present invention, an $Ni_3(Si, Ti)$-based intermetallic compound having such a Vickers' hardness can be obtained.

Next, effect demonstration experiments will be described.
[Demonstration Experiment 1]
(Preparation of Intermetallic Compound)
(1) Ingot Sample Preparation Step Table 4 shows the compositions of seven kinds of intermetallic compounds prepared in Demonstration Experiment 1 and the composition of an intermetallic compound prepared for comparison. As shown in Table 4, the compositions of these intermetallic compounds were determined so that the total content of Ti and Ta is constant in Demonstration Experiment 1. Here, the intermetallic compound prepared for comparison is an intermetallic compound disclosed in Patent Document 1.

TABLE 4

| | Ni at % | Si at % | Ti at % | Ta at % | B wt ppm | Remarks: Shortened sample name |
|---|---|---|---|---|---|---|
| Comparative Example Sample | 79.5 | 11.0 | 9.5 | — | 50 | Unalloyed or 0Ta |
| Example Sample 1 | 79.5 | 11.0 | 8.5 | 1.0 | 50 | 1Ta |
| Example Sample 2 | 79.5 | 11.0 | 7.5 | 2.0 | 50 | 2Ta |
| Example Sample 3 | 79.5 | 11.0 | 6.5 | 3.0 | 50 | 3Ta |
| Example Sample 4 | 79.5 | 11.0 | 5.5 | 4.0 | 50 | 4Ta |
| Example Sample 5 | 79.5 | 11.0 | 4.5 | 5.0 | 50 | 5Ta |
| Example Sample 6 | 79.5 | 11.0 | 3.5 | 6.0 | 50 | 6Ta |
| Example Sample 7 | 79.5 | 11.0 | 2.5 | 7.0 | 50 | 7Ta |

First, the respective metals (purity of each metal: 99.9% by weight or more) and B were weighted so as to form the eight kinds of compositions shown in Table 4. Subsequently, the weighted metals and B were melted in an arc melting furnace and cast to prepare ingots each having a weight of approximately 130 g. A melting chamber of the arc melting furnace was evacuated, and then the atmosphere in the arc melting furnace was replaced with an inert gas (argon gas). Non-consumable tungsten electrodes were employed as electrodes of the furnace, and a water-cooling copper hearth was employed as a mold.

(2) Homogenization Heat Treatment Step

Subsequently, a homogenization heat treatment step was performed in which each ingot was retained in a vacuum at 1050° C. for 48 hours for homogenization. As described above, the samples were prepared.

The samples containing Ta are examples of the present invention, each of which, hereinafter, is referred to as "Example Sample" with a number representing a content of Ta such as, for example, "Example Sample 2" when the content of Ta is 2 atomic %. On the other hand, the sample not containing Ta is referred to as "Comparative Example Sample".

Next, evaluation methods and evaluation results will be described.
(1) Microstructure Observation First, SEM photographs of the microstructures of Example
Samples prepared as described above were taken. One of the photographs is shown in FIG. 1. FIG. 1 is an SEM photograph of Example Sample 2.

FIG. 1 reveals that Example Sample 2 has a single-phase microstructure composed of crystal grains having a grain size of several hundred microns. The Vickers' hardness of Example Sample 2 was 434 HV.

Figure 2:
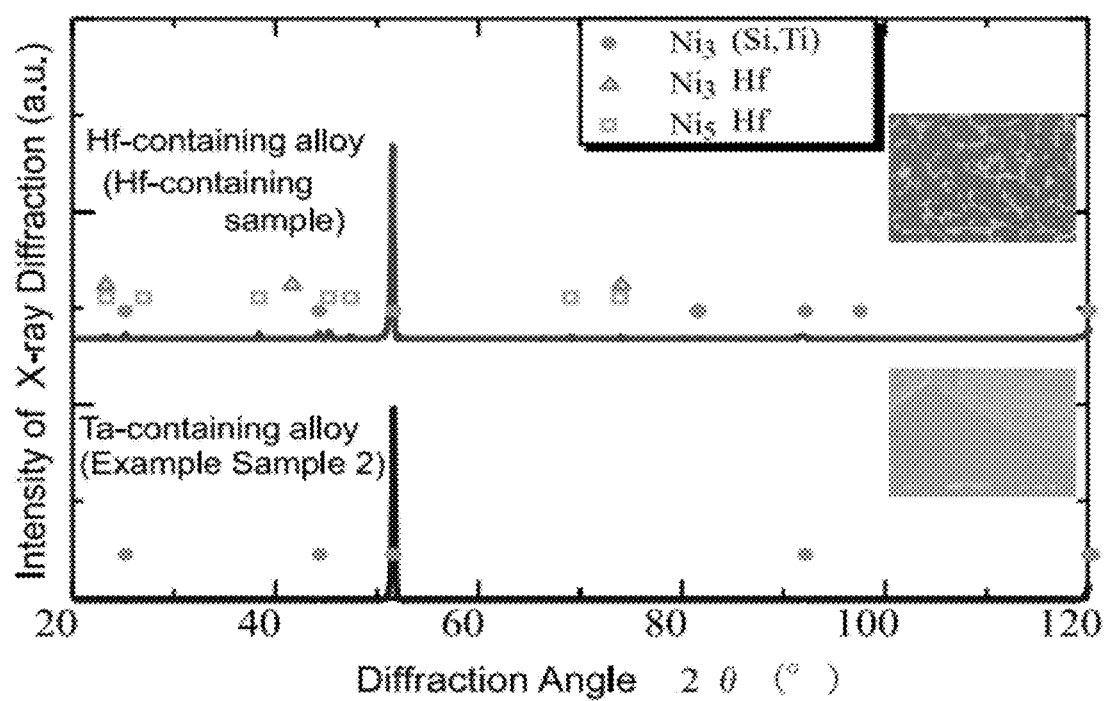
FIG. 2 shows an X-ray diffraction profile of Example Sample 2. The upper is an X-ray diffraction profile of an Hf-containing sample (reference sample), which is an example of Comparative Example Sample, and the lower is the X-ray diffraction profile of Example Sample 2.

Next, X-ray measurement was performed on each Example Sample in order to identify constituent phases in the microstructure. FIG. 2 shows the measurement results. FIG. 2 shows an X-ray diffraction profile of Example Sample 2. For reference, an X-ray diffraction profile of $Ni_{77.5}Si_{11.0}Ti_{9.5}Hf_{2.0}$+50 wt ppm B (represented by atomic % except for B; hereinafter, referred to as "Hf-containing sample") is shown together. The upper is the X-ray diffraction profile of the Hf-containing sample, and the lower is the X-ray diffraction profile of Example Sample 2. The dots in the drawing represent peak positions of profiles of known materials, that is, $Ni_3(Si, Ti)$ (Comparative Example sample), $Ni_3Hf$ and $Ni_5Hf$. The circular dots represent peak positions of the profile of $Ni_3(Si, Ti)$, the triangular dots represent peak positions of the profile of $Ni_3Hf$, and the quadrangular dots represent peak positions of the profile of $Ni_5Hf$. In addition, the Hf-containing sample shown here was prepared by the same method as in Example Samples.

FIG. 2 reveals that the X-ray diffraction profile of Example Sample 2 agrees with the profile of $Ni_3(Si, Ti)$ in peak positions. Since Example Sample 2 has a single-phase microstructure, the results allow the constituent phase of Example Sample 2 to be identified as an $L1_2$ phase.

The profile of the Hf-containing sample agreed with the profiles of $Ni_3Hf$ and $Ni_5Hf$ as well as $Ni_3(Si, Ti)$ in peak positions. In the Hf-containing sample, unlike Example Sample 2, a phase of $Ni_3Hf$ and $Ni_5Hf$ was dispersed.

Figure 3:
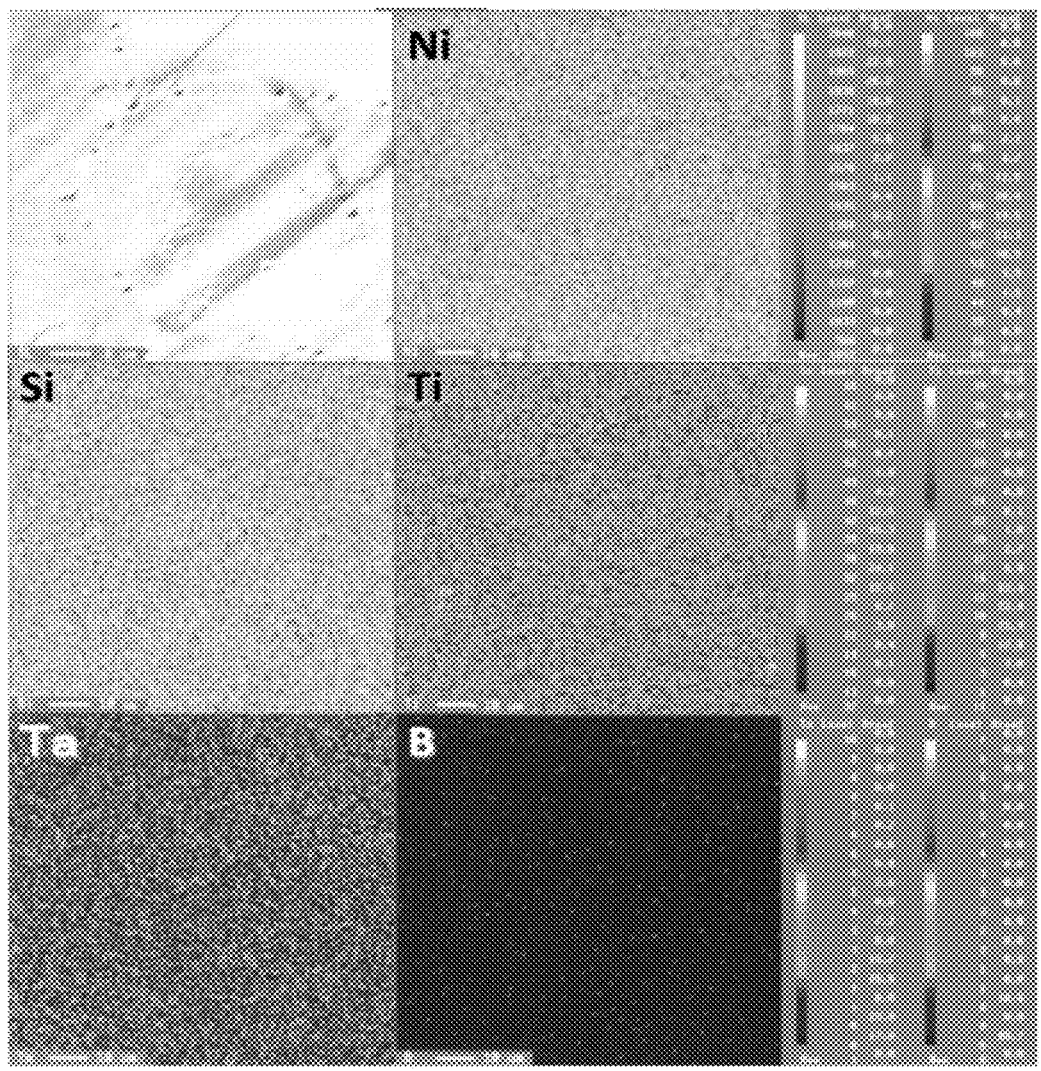
FIG. 3 shows element maps of Example Sample 2 according to EPMA.

Further, EPMA was performed on each Example Sample for microstructure analysis. FIG. 3 shows the analysis results. FIG. 3 shows element maps of Example Sample 2 according to the EPMA. In FIG. 3, the upper left image is an SEM photograph, the upper right image is a map of Ni, the center left image is a map of Si, the center right image is a map of Ti, the lower left image is a map of Ta, and the lower right image is a map of B.

FIG. 3 shows that the composition is uniform throughout the microstructure in all the element maps including the map of Ni. In the EPMA, point analysis was performed to find that the compositions are substantially as weighed, as shown in Table 5.

TABLE 5

|  | Ni at % | Si at % | Ti at % | Ta at % | B at % |
|---|---|---|---|---|---|
| Example Sample 2 | 78.9 | 11.6 | 7.7 | 1.8 | 0.0 |

(2) Vickers' Hardness Test

Figure 4:
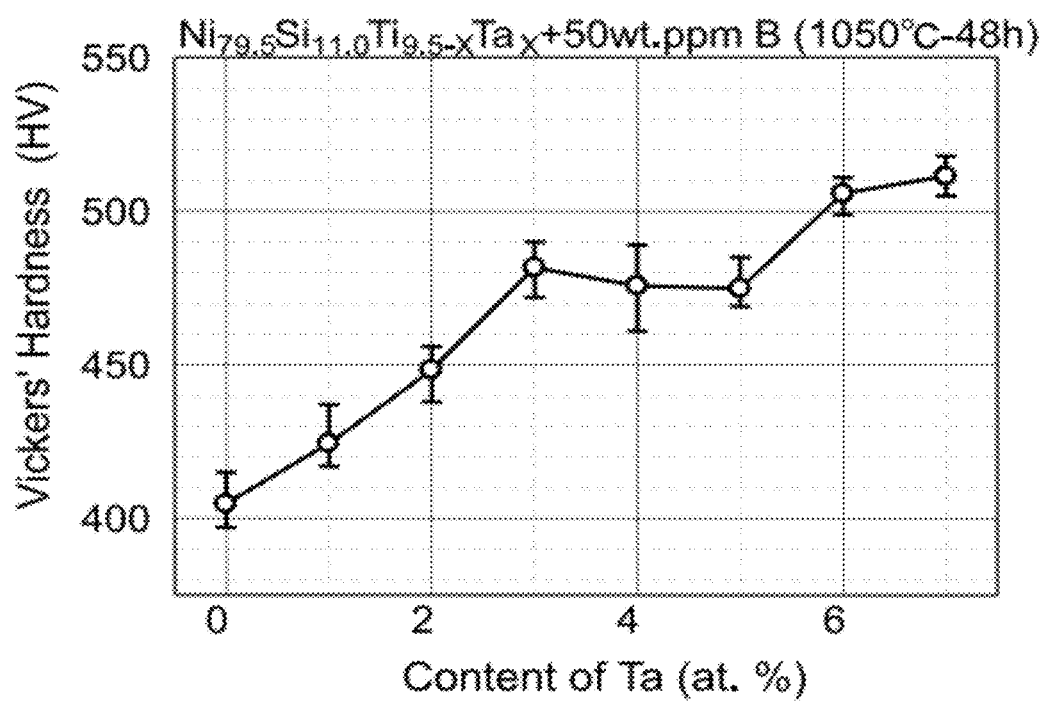
FIG. 4 is a graph showing results of a Vickers' hardness test in Demonstration Experiment 1, that is, the relationship between the Vickers' hardness and the content of Ta.

Next, a Vickers' hardness test was performed on each sample. In the Vickers' hardness test, a square pyramid diamond indenter was pushed into each sample at room temperature. In the test, the load was mainly 300 g, and the retention time was 20 seconds. FIG. 4 shows the test results. FIG. 4 is a graph showing the relationship between the Vickers' hardness and the content of Ta. The horizontal axis represents the content of Ta, and the left most dot of the measurement corresponds to Comparative Example Sample and the other dots of the measurement correspond to Example Samples.

FIG. 4 indicates that each Example Sample has a greater Vickers' hardness than Comparative Example Sample. It is revealed that addition of Ta to $Ni_3(Si, Ti)$ of Comparative Example Sample increases the hardness of the sample and that the value of the Vickers' hardness increases as the content of Ta increases.

Demonstration Experiment 1 as described above has demonstrated that Example Samples have superior hardness (strength) characteristics to Comparative Example Sample.

[Demonstration Experiment 2]

Further, samples having the same compositions as in Demonstration Experiment 1 (same compositions as shown in Table 4) were prepared in the same manner as in Demonstration Experiment 1 and subjected to (1) microstructure observation, (2) room-temperature Vickers' hardness test, (3) high-temperature Vickers' hardness test, (4) room-temperature tensile test, (5) oxidation resistance test and (6) wear test.

(1) Microstructure Observation

Figure 5:
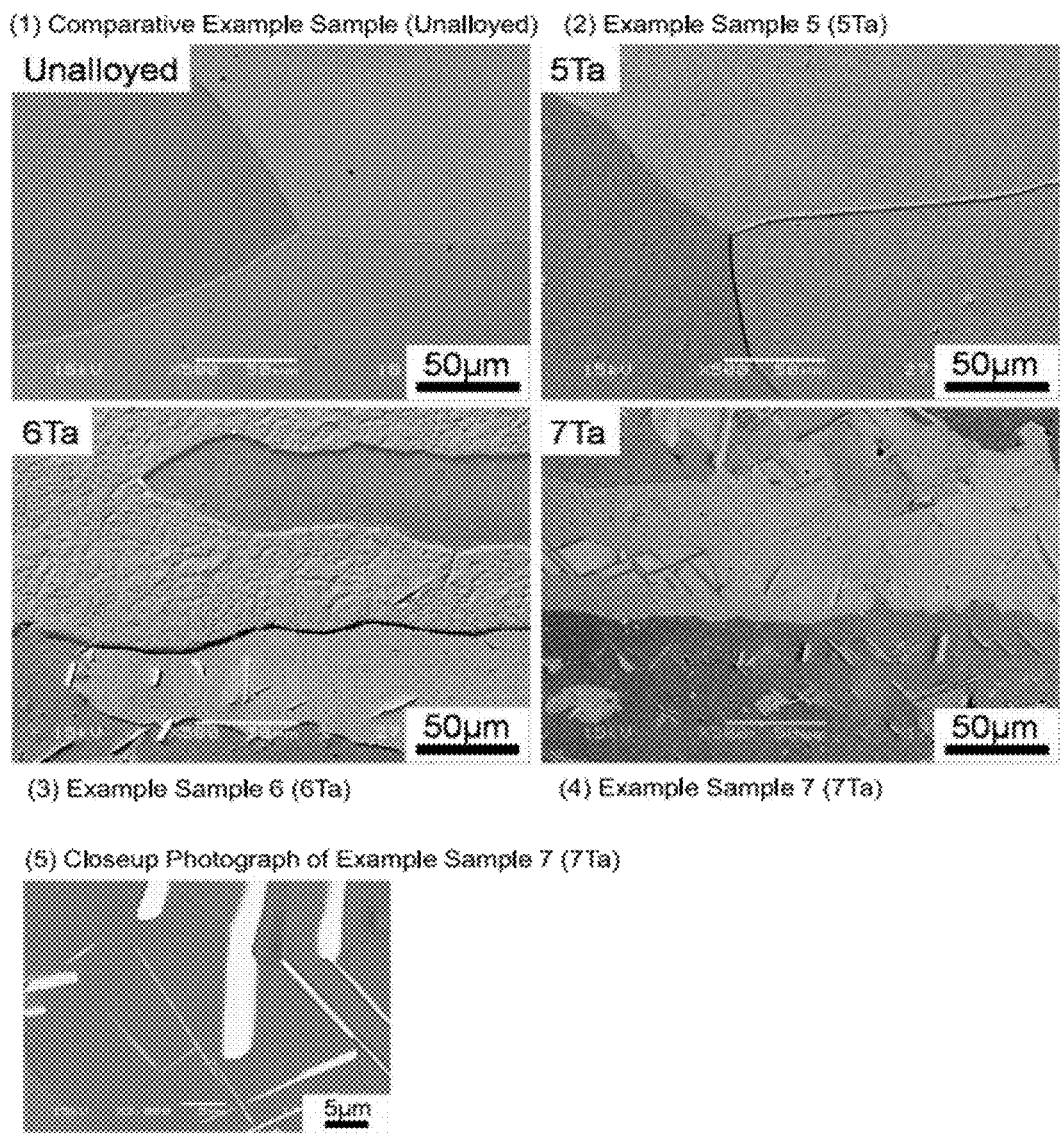
FIG. 5 shows SEM photographs of Comparative Example Sample and Example Samples.

First, an SEM photograph of the microstructure of each Example Sample prepared was taken. Some of the photographs are shown in FIG. 5. FIG. 5 shows SEM photographs of Comparative Example Sample and Example Samples, wherein (1) is an SEM photograph of Comparative Example Sample, (2) is an SEM photograph of Example Sample 5, (3) is an SEM photograph of Example Sample 6 and (4) is an SEM photograph of Example Sample 7. In FIG. 5, in addition, (5) is a magnified SEM photograph of a second phase dispersion of Example Sample 7.

FIG. 5 reveals that Comparative Example Sample and Example Sample 5 have a single-phase microstructure as in the case of FIG. 1 in Demonstration Experiment 1. Observation of these samples and the other Example Samples has revealed that Ta constitutes a solid solution to form a single-phase microstructure when the content of Ta is 5.0 atomic % or less.

FIG. 5 also reveals that a secondary phase is dispersed in the microstructure of a primary phase, which is a parent phase (matrix), in Example Samples 6 and 7. That is, it is revealed that Example Samples 6 and 7 each comprise a primary phase and a secondary phase, and the secondary phase is dispersed in the primary phase. When the content of Ta was 6.0 atomic % (Example Sample 6), a small amount of plate-like second phase dispersion was observed (for its shape, see FIG. 5 (5)). Further, when the content of Ta was 7.0 atomic % (Example Sample 7), there was observed a phenomenon that the volume fraction of the second phase dispersion (proportion of the second phase dispersion in the microstructure) increased. It is also observed that the crystal grain size of the $L1_2$ phase is slightly decreased by an effect of the second phase dispersion, if any.

Figure 6:
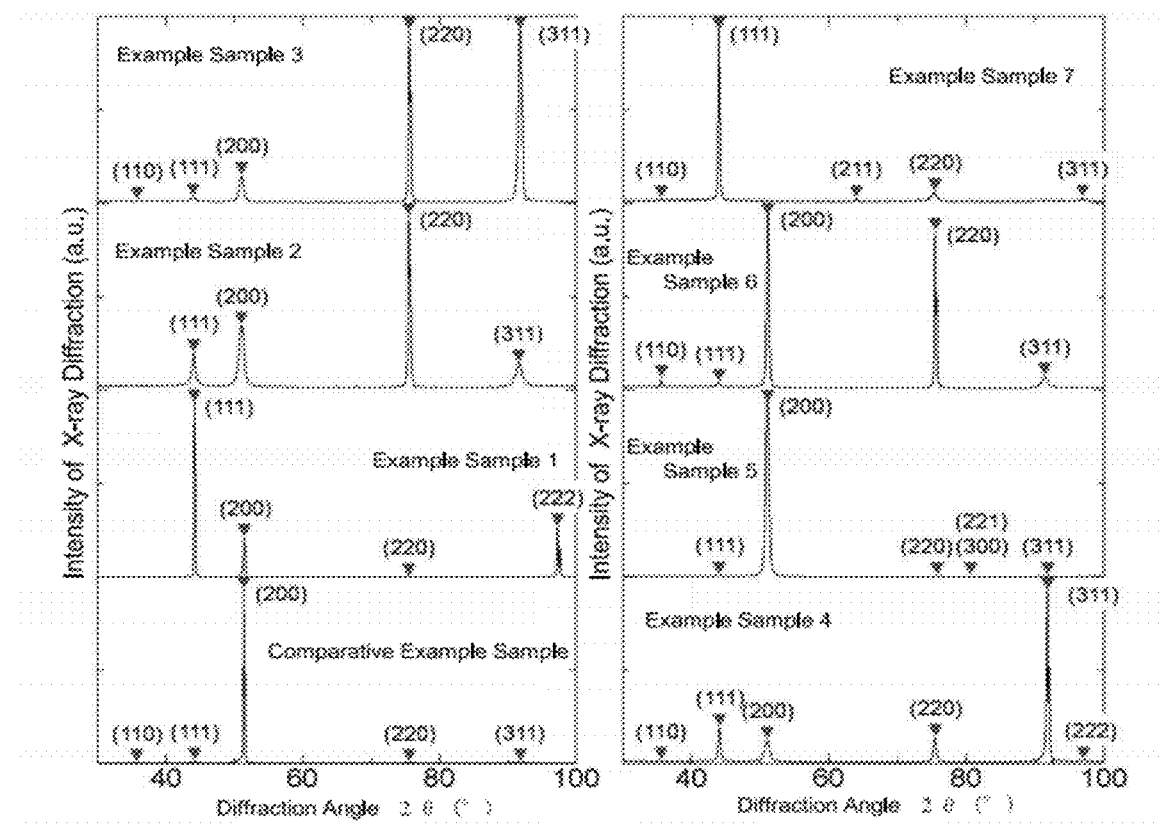
FIG. 6 shows X-ray diffraction profiles of Comparative Example Sample and Example Samples 1-7.
Figure 7:
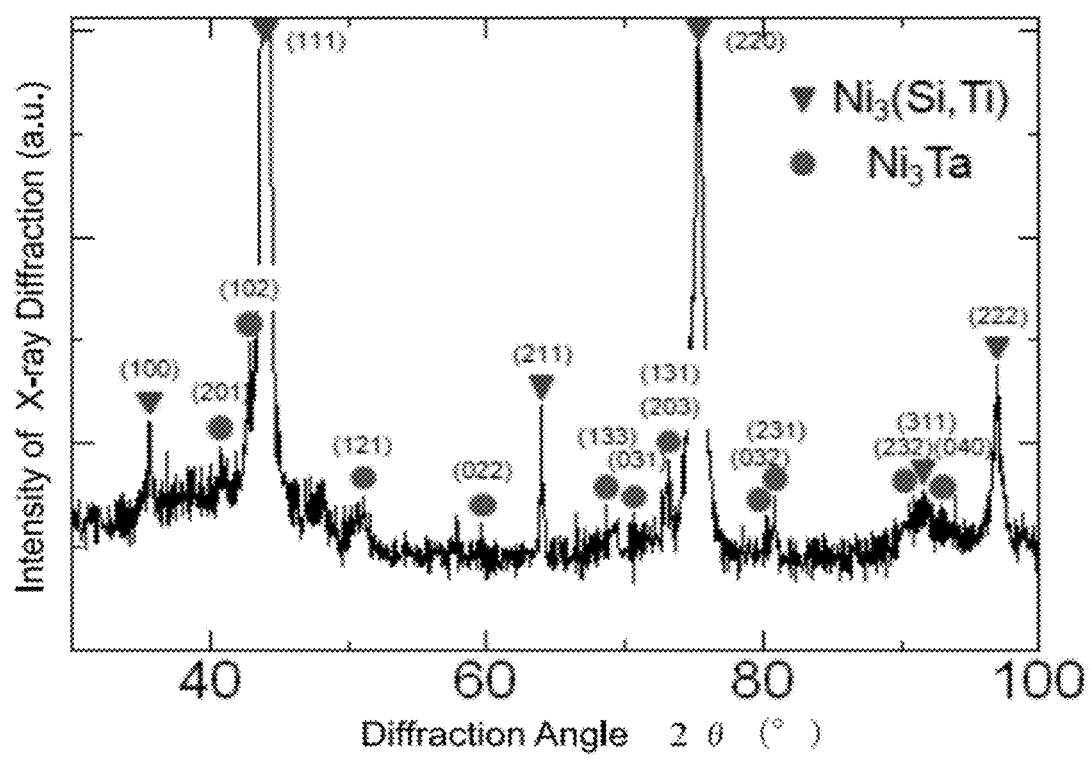
FIG. 7 is a diagram of an enlarged X-ray diffraction profile of Example Sample 7.

Next, X-ray measurement was performed on each Example Sample in order to identify the constituent phases in the microstructure. FIGS. 6 and 7 show the measurement results. FIG. 6 shows X-ray diffraction profiles of Comparative Example Sample and Example Samples 1-7. In FIG. 6, inverted triangular dots represent peak positions of the profile of $Ni_3(Si, Ti)$ as a known material (this material is composed of an $L1_2$ phase), and the numerical values thereabove are plane indices of the diffraction crystal plane. Further, FIG. 7 is a diagram of an enlarged X-ray diffraction profile of Example Sample 7, for which measurement was carried out separately from FIG. 6 in order to identify the phases of Example Sample 7. In FIG. 7, as in the case of FIG. 6, inverted triangular dots represent peak positions of the profile of $Ni_3(Si, Ti)$. In addition, the circular dots represent peak positions of the profile of $Ni_3Ta$.

FIG. 6 reveals that the X-ray diffraction profiles of the samples agree with the profile of $Ni_3(Si, Ti)$ in peak positions, indicating that the samples are each composed of an L1$_2$ phase. In view of these results and the results of the above-described SEM observation (FIG. 5), it is revealed that the single phase of the microstructures of Comparative Example Sample and Example Samples 2-5 is an L1$_2$ phase, and the parent phase (primary phase occupying gaps in the secondary phase) of Example Samples 6 and 7 is also an L1$_2$ phase.

Further, FIG. 7 reveals that the X-ray diffraction profile of Example Sample 7 agrees with the profile of Ni$_3$Ta as well as the profile of Ni$_3$(Si, Ti) in peak positions. This result indicates that Example Sample 7 is composed of an L1$_2$ phase (primary phase) and a secondary phase of Ni$_3$Ta (phase containing Ni and Ta). As a result, the secondary phase observed in FIG. 5 has been identified as Ni$_3$Ta.

In the measurement, no clear peak was observed at any other positions than the peak positions in the profiles of Ni$_3$(Si, Ti) and Ni$_3$Ta, indicating that Example Sample 7 substantially consists only of the L1$_2$ phase and the secondary phase of Ni$_3$Ta.

Figure 8:
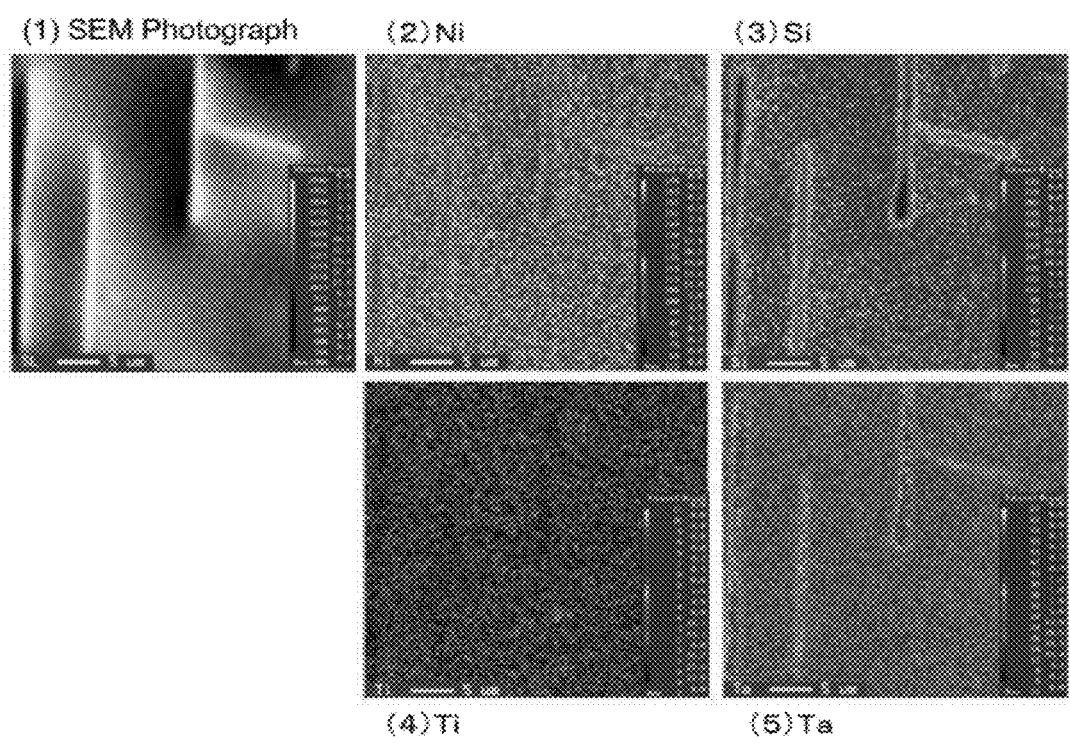
FIG. 8 shows element maps of Example Sample 7 according to EPMA.

Next, EPMA was performed on Comparative Example Sample and each Example Sample. FIG. 8 shows the analysis results. FIG. 8 shows element maps of Example Sample 7 according to the EPMA. In FIG. 8, (1) is an SEM photograph (upper left image), (2) is a map of Ni (upper center image), (3) is a map of Si (upper right image), (4) is a map of Ti (lower center image), and (5) is a map of Ta (lower right image).

As obvious from (1) in FIG. 8, the primary phase and the secondary phase are included in the area targeted by the EPMA. However, the images in FIG. 8 reveal that the amount of each element is different between the phases. For example, the contents of Ni, Si and Ta are different between the two phases, but the content of Ti is not so different.

Further, EPMA was performed also on the other samples than Example Sample 7, in which point analysis was performed on the parent phase (primary phase). Table 6 shows the analysis results.

TABLE 6

|  | Ni at % | Si at % | Ti at % | Ta at % |
|---|---|---|---|---|
| Comparative Example Sample | 79.56 | 10.96 | 9.28 | — |
| Example Sample 1 | 79.46 | 11.16 | 8.46 | 0.92 |
| Example Sample 2 | 79.58 | 11.10 | 7.36 | 1.96 |
| Example Sample 3 | 79.91 | 11.24 | 5.99 | 2.86 |
| Example Sample 4 | 79.52 | 10.92 | 5.58 | 3.98 |
| Example Sample 5 | 79.27 | 11.57 | 4.35 | 4.81 |
| Example Sample 6 | 79.95 | 11.49 | 2.95 | 5.60 |
| Example Sample 7 | 79.67 | 12.07 | 2.54 | 5.72 |

Table 6 shows that the Ta content of the parent phase (primary phase) in Example Samples 6 and 7 is 5.6-5.7 atomic %, indicating that the upper limit of the Ta content of the parent phase (primary phase) is 5-6 atomic %. This result and FIG. 5 reveal that the solid solubility limit of Ta in the Ni$_3$(Si, Ti) alloy is 5-6 atomic %.

(2) Room-Temperature Vickers' Hardness Test

Figure 9:
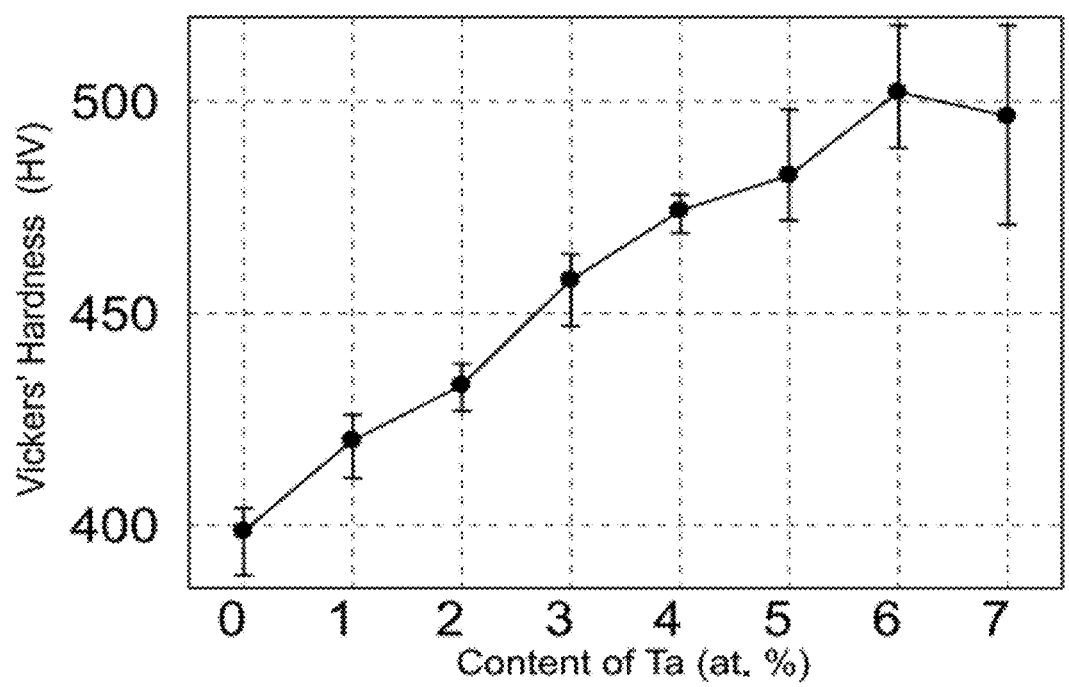
FIG. 9 is a graph showing results of a Vickers' hardness test in Demonstration Experiment 2, that is, a graph showing the relationship between the Vickers' hardness and the content of Ta.

Next, a Vickers' hardness test was performed on each sample in the same manner as in Demonstration Experiment 1. In the Vickers' hardness test, the load was 1 kg, and the retention time was 20 seconds (room temperature: approximately 25° C.). FIG. 9 shows the test results. FIG. 9 is a graph showing the results of the Vickers' hardness test in Demonstration Experiment 2, that is, a graph showing the relationship between the Vickers' hardness and the content of Ta. The respective axes are as defined in Demonstration Experiment 1.

FIG. 9 indicates that the value of the Vickers' hardness increases substantially with increase of the content of Ta until the content of Ta exceeds 6.0 atomic %, and the value of the Vickers' hardness hardly increases to be substantially constant once the content of Ta exceeds 6.0 atomic %. While the results of the point analysis in the EPMA shown in Table 6 have revealed that the content of Ta in the parent phase is substantially constant when exceeding the solid solubility limit, this result of the Vickers' hardness test is considered because the substantially constant content of Ta in the parent phase prevents further occurrence of solid solution strengthening.

Figure 10:
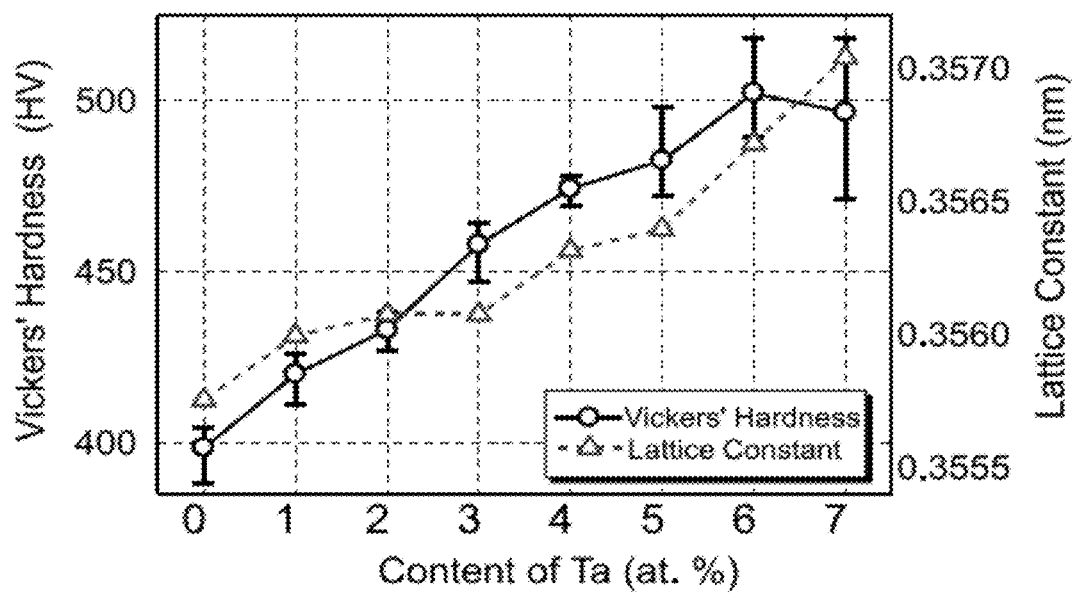
FIG. 10 is a graph showing the relationship of the Vickers' hardness and the lattice constant to the content of Ta.

In addition, the correlation between the Vickers' hardness and the lattice constant was studied. Table 7 and FIG. 10 show the results. Table 7 shows the lattice constant of each sample, and FIG. 10 is a graph showing the relationship of the Vickers' hardness and the lattice constant to the content of Ta. The lattice constant shown in Table 7 and FIG. 10 is the lattice constant of the crystal lattice of the L1$_2$ phase, which was calculated from the X-ray measurement results (X-ray diffraction profiles of Comparative Example Sample and each Example Sample) shown in FIG. 6.

TABLE 7

| Sample (shortened name) |  | Lattice constant |
|---|---|---|
| Comparative Example Sample | 0Ta | 0.3558 |
| Example Sample 1 | 1Ta | 0.3560 |
| Example Sample 2 | 2Ta | 0.3561 |
| Example Sample 3 | 3Ta | 0.3561 |
| Example Sample 4 | 4Ta | 0.3563 |
| Example Sample 5 | 5Ta | 0.3564 |
| Example Sample 6 | 6Ta | 0.3567 |
| Example Sample 7 | 7Ta | 0.3570 |

*unit: nm

Table 7 and FIG. 10 reveal that the lattice constant tends to increase with increase of the Vickers' hardness. Specifically, it is considered because Ta included in the L1$_2$ phase as a solid solution caused lattice strain, and solid solution strengthening of the Ta increased the hardness.

(3) High-Temperature Vickers' Hardness Test

Figure 11:
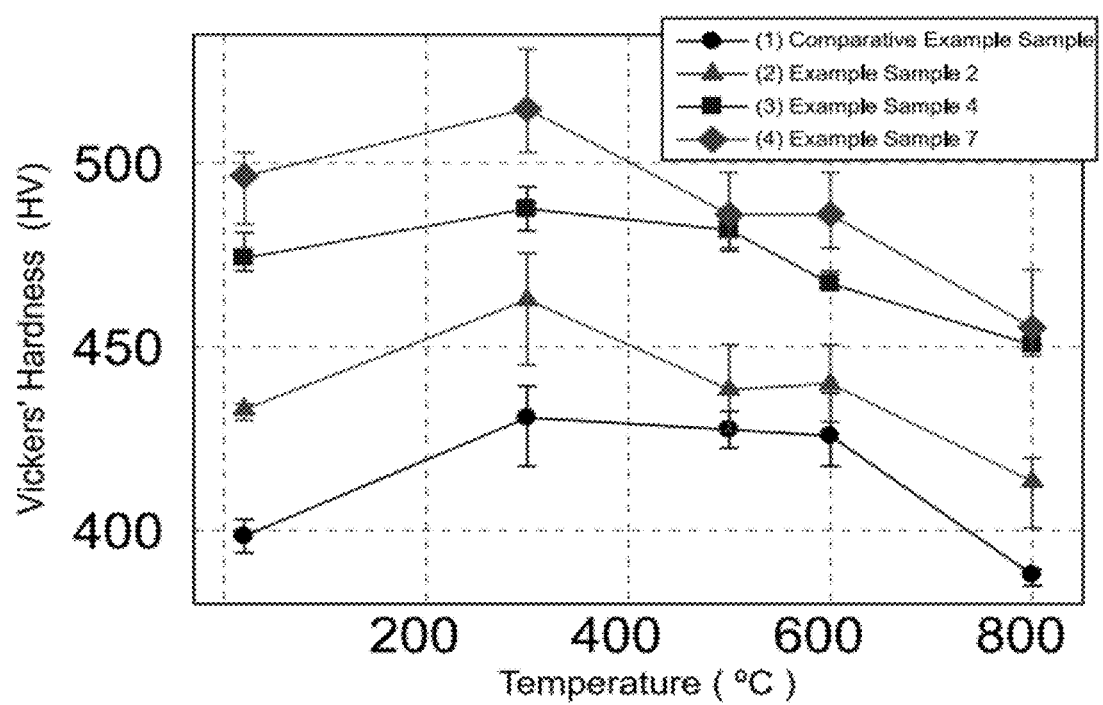
FIG. 11 is a graph showing change of the Vickers' hardness of Comparative Example Sample, and Example Samples 2, 4 and 7 at high temperatures.

Next, a Vickers' hardness test was performed on each sample at high temperatures (300° C., 500° C., 600° C. and 800° C.). In the Vickers' hardness test, the load was 1 kg, the retention time was 20 seconds, and the temperature was raised by 10° C. per minute in a reducing atmosphere (Ar+ approximately 10% H$_2$). FIG. 11 shows the test results together with the results of the above-described room-temperature Vickers' hardness test. FIG. 11 is a graph showing change of the Vickers' hardness of Comparative Example Sample, and Example Samples 2, 4 and 7 at high temperatures. In FIG. 11, (1) represents the Vickers' hardness of Comparative Example Sample, (2) represents the Vickers' hardness of Example Sample 2, (3) represents the Vickers' hardness of Example Sample 4, and (4) represents the Vickers' hardness of Example Sample 7.

FIG. 11 reveals that Example Samples 2, 4 and 7 are harder than Comparative Example Sample in all temperature ranges. This result indicates that addition of Ta to an Ni$_3$(Si, Ti) alloy can enhance the hardness of the alloy in all temperature ranges.

Specifically, Example Sample 2 had a Vickers' hardness of approximately 410 HV at 800° C. and Example Sample 7 had a Vickers' hardness of approximately 520 HV at 300° C., that is, these samples had a Vickers' hardness of from approximately 410 HV to approximately 520 HV in a range of temperature from room temperature to the above-mentioned high temperatures.

FIG. 11 also reveals that the hardness of all the alloys show inverse temperature dependency. That is, these alloys have characteristics of the hardness that atypically increases with a rise in temperature. Typically, the values of the Vickers' hardness of alloys decrease with a rise in temperature. On the contrary, Example Samples have specific characteristics as well as Comparative Example Sample.

Further, comparison in terms of the softening amount at 800° C. reveals that Example Sample 7 has a greater softening amount than Example Samples 2 and 4. This result indicates that the $L1_2$ single-phase microstructure has superior high-temperature hardness characteristics to the microstructure having two phases (two-phase microstructure).

(4) Room-Temperature Tensile Test

Figure 12:
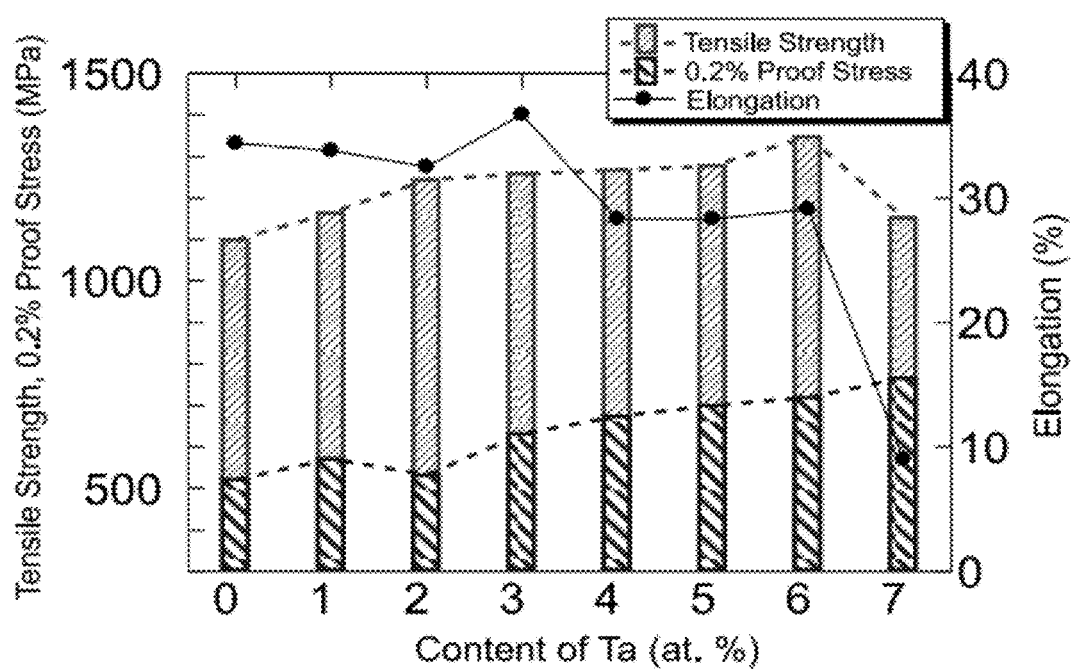
FIG. 12 is a graph showing the relationship of tensile strength, 0.2% proof stress and elongation to Ta content of samples.

Next, a tensile test was performed on each sample. The tensile test was performed at room temperature in a vacuum at a strain rate of $1.66 \times 10^{-4}$ s$^{-1}$ by using a test piece having a gauge size of 10×2×1 mm$^3$. FIG. 12 shows the test results. FIG. 12 is a graph showing the relationship of tensile strength, 0.2% proof stress and elongation to Ta content of the samples. In FIG. 12, the horizontal axis represents the Ta content (atomic %) of each sample, the left vertical axis represents the tensile strength or the 0.2% proof stress (MPa), and the right vertical axis represents the elongation (%).

FIG. 12 indicates that Example Samples 1-7 are superior in tensile strength and 0.2% proof stress to Comparative Example Sample. This result indicates that addition of Ta to an $Ni_3(Si, Ti)$ alloy can enhance the tensile strength and the 0.2% proof stress of the alloy. The addition of Ta to the alloys enhanced the tensile strength and the 0.2% proof stress by approximately 200 MPa at the maximum.

FIG. 12 also indicates that Comparative Example Sample and Example Samples 1-6 all maintain an elongation of approximately 30%. Even in comparison with a conventional intermetallic compound, for example, the $Ni_3(Si, Ti)$ alloys disclosed in Patent Document 2 (Japanese Unexamined Patent Publication No. HEI 5(1993)-320794) having an elongation of 1-6% or 12-24%, it is revealed that these alloys have sufficient ductility as structural materials of machine elements. On the other hand, it is indicated that Example Sample 7 is enhanced in 0.2% proof stress but reduced in tensile strength and elongation in comparison with Example Samples 1-6.

The results have revealed that (1) addition of Ta to an $Ni_3(Si, Ti)$ alloy slightly reduces the elongation of the alloy but allows maintenance of an elongation of approximately 30%, and (2) a Ta content that has reached 7 a atomic % reduces the tensile strength and the elongation.

Figure 13:
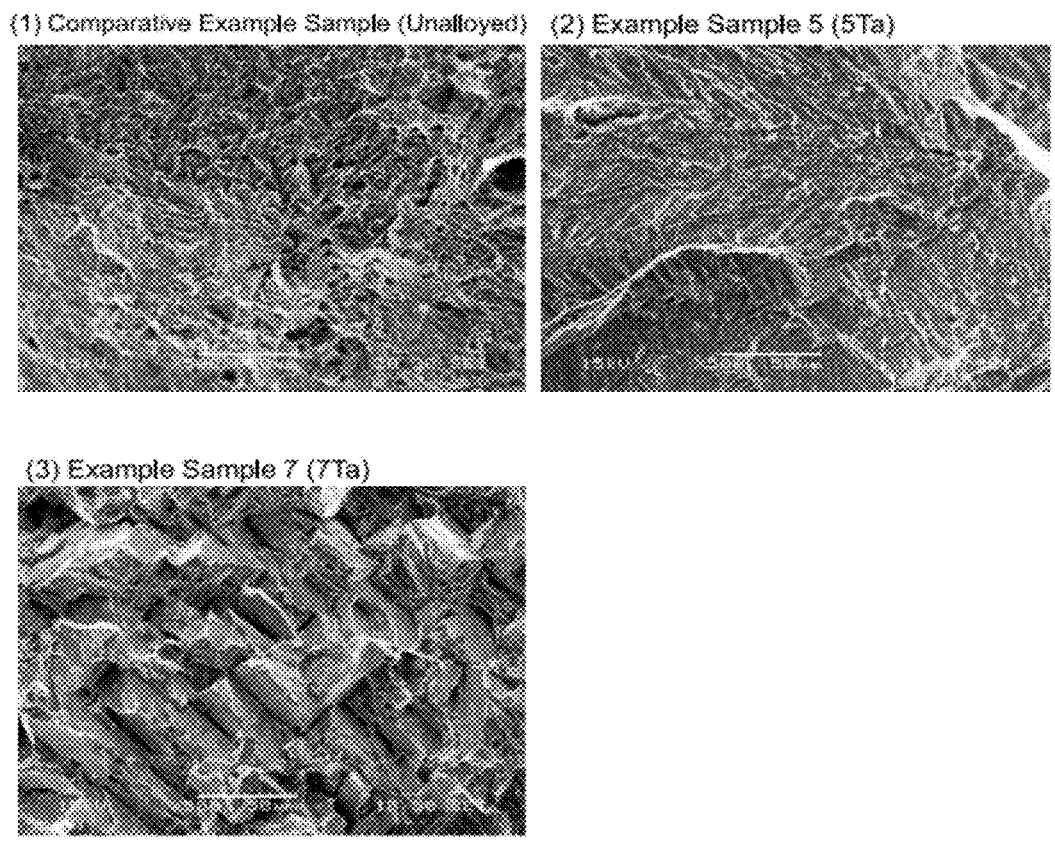
FIG. 13 shows photographs of fracture surfaces of Comparative Example Sample, and Example Samples 5 and 7 after a tensile test.

After the tensile test, fracture surface observation was performed on each sample. FIG. 13 shows the observation results. FIG. 13 shows photographs of fracture surfaces of Comparative Example Sample, and Example Samples 5 and 7 after the tensile test, in which (1) shows the fracture surface of Comparative Example Sample, (2) shows the fracture surface of Example Sample 5, and (3) shows the fracture surface of Example Sample 7.

FIG. 13 indicates that Comparative Example Sample has a ductile fracture surface having a dimple pattern and Example Sample 5 also has a fracture surface having a dimple pattern but recesses therein are shallower. FIG. 13 also indicates that Example Sample 7 has many areas having a brittle fracture surface broken at a specific crystal plane. The observation has revealed that addition of Ta to an $Ni_3(Si, Ti)$ alloy changes the fracture form but enhances the tensile strength while maintaining the elongation. It has been also revealed that a Ta content that has reached 7 atomic % further changes the fracture form and reduces the tensile strength. This is considered due to influence of the second phase dispersions.

(5) Oxidation Resistance Test

Figure 14:
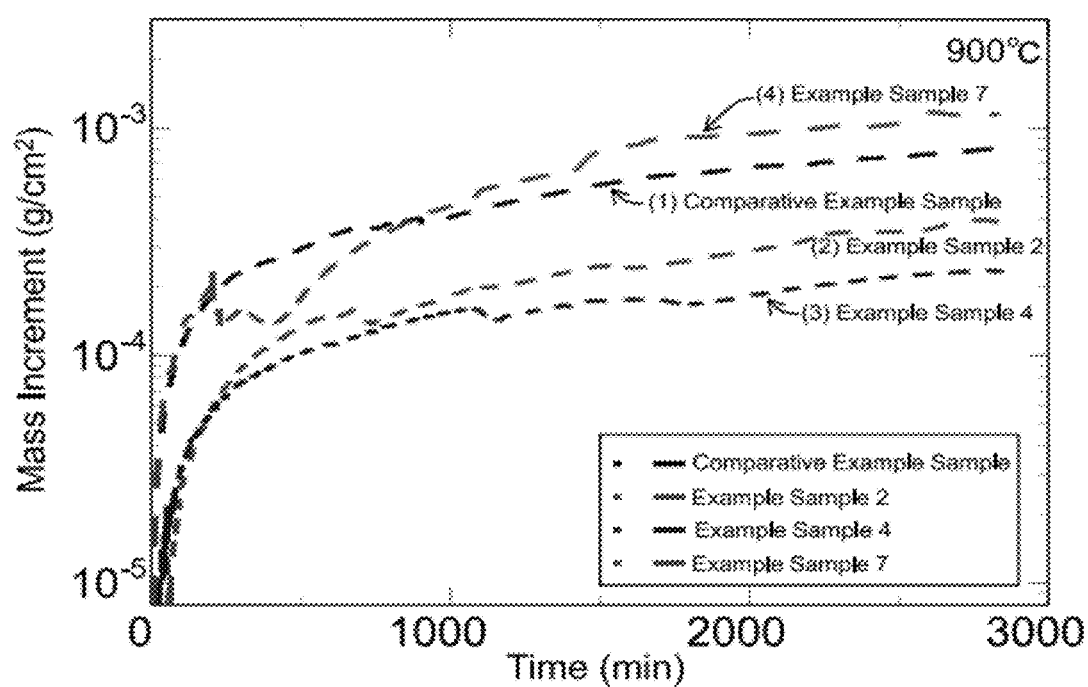
FIG. 14 is a graph showing the relationship between time and the mass increment of Comparative Example Sample and Example Samples 2, 4 and 7 due to an oxidation resistance test.

Next, an oxidation resistance test was performed on each sample. The oxidation resistance test was performed by TG-DTA (Thermogravimetry—Differential Thermal Analysis). Specifically, each sample was measured for the mass increment per unit surface area when exposed to the atmosphere at 900° C. FIG. 14 shows the test results.

FIG. 14 is a graph showing the relationship between time and the mass increment of Comparative Example Sample, and Example Samples 2, 4 and 7 due to the oxidation resistance test, that is, showing results of the oxidation resistance test of Comparative Example Sample, Example Sample 2, Example Sample 4 and Example Sample 7.

FIG. 14 indicates that, Example Samples 2 and 4 have a smaller mass increment due to oxidation than Comparative Example Sample. The mass increment is smaller in order of Example Sample 4, Example Sample 2, Comparative Example Sample and Example Sample 7 when the time is over 1000 minutes. In view of the fact that Example Samples 2 and 4 have a single-phase microstructure, it is revealed that the oxidation resistance is enhanced when Ta is added to an $Ni_3(Si, Ti)$ alloy to form a single-phase microstructure.

(6) Wear Test

Figure 15:
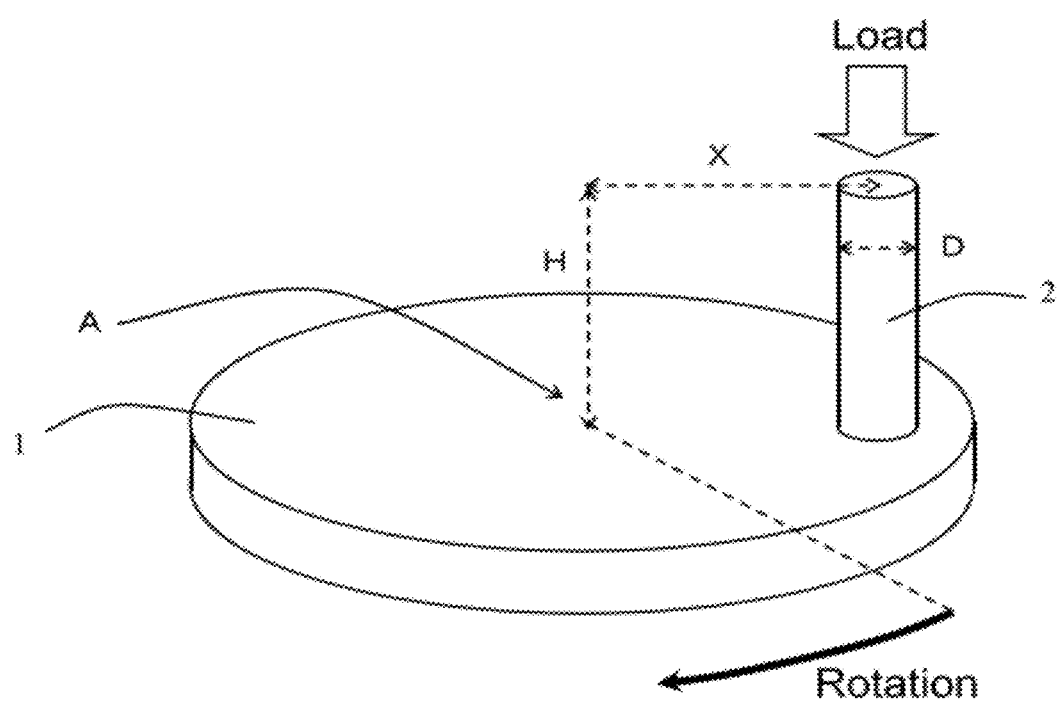
FIG. 15 is a conception diagram for illustrating a pin-on-disk wear test.

Next, an wear test was performed on each sample. The wear test performed in Demonstration Experiment 2 is a pin-on-disk wear test, a method of which is illustrated in FIG. 15. FIG. 15 is a conception diagram for illustrating the pin-on-disk wear test.

As illustrated in FIG. 15, the pin-on-disk wear test is to evaluate the wear resistance of a pin by setting a pin 2 being evaluated on a disk 1, applying load to one end of the pin 2 with the other end of the pin 2 being set in contact with a surface for sliding (upper surface in FIG. 15) of the disk 1, and rotating the disk 1. A cemented carbide (G5) was used for the disk, and the pin 2 was obtained by forming each sample into a cylindrical shape. Specifically, the cylindrical pin 2 having a height of 15 mm (H in FIG. 15) and a diameter of 5 mm (D in FIG. 15) was placed on the disk at a distance of 15 mm (X in FIG. 15) from the center to perform the test. The pin-on-disk wear test was performed in the atmosphere at room temperature (approximately 25° C.) for 30 minutes under a load of 100 N, at rotation frequency of 300 rpm and by a total sliding distance of 1413.7 m. The test was a dry wear test without the use of lubricating oil. The wear resistance was evaluated according to amounts of mass loss and volume loss of the pin after the total sliding distance. FIG. 8 shows the test results.

Table 8 shows the wear mass loss, the wear volume loss rate and the wear resistance ratio of each sample in the wear test. In Table 8, the wear mass loss refers to the amount of mass loss of the pin due to the wear test, and the wear volume loss rate refers to the amount of volume loss of the pin relative to the sliding distance (amount of volume loss of the pin per unit distance). In addition, the wear resistance ratio refers to a ratio (index) representing better or worse wear resistance of each sample to Comparative Example Sample, which is 1.

TABLE 8

| Samples | Wear mass loss Unit: g | Wear volume loss rate Unit: $10^{-3}$ mm$^3$/m | Wear resistance ratio (to Comparative Example Sample, which is 1) |
| --- | --- | --- | --- |
| Comparative Example Sample | 0.11208 | 9.88 | 1.00 |
| Example Sample 2 | 0.10771 | 9.17 | 1.08 |
| Example Sample 4 | 0.07878 | 6.35 | 1.56 |
| Example Sample 7 | 0.07804 | 5.94 | 1.66 |

Figure 16:
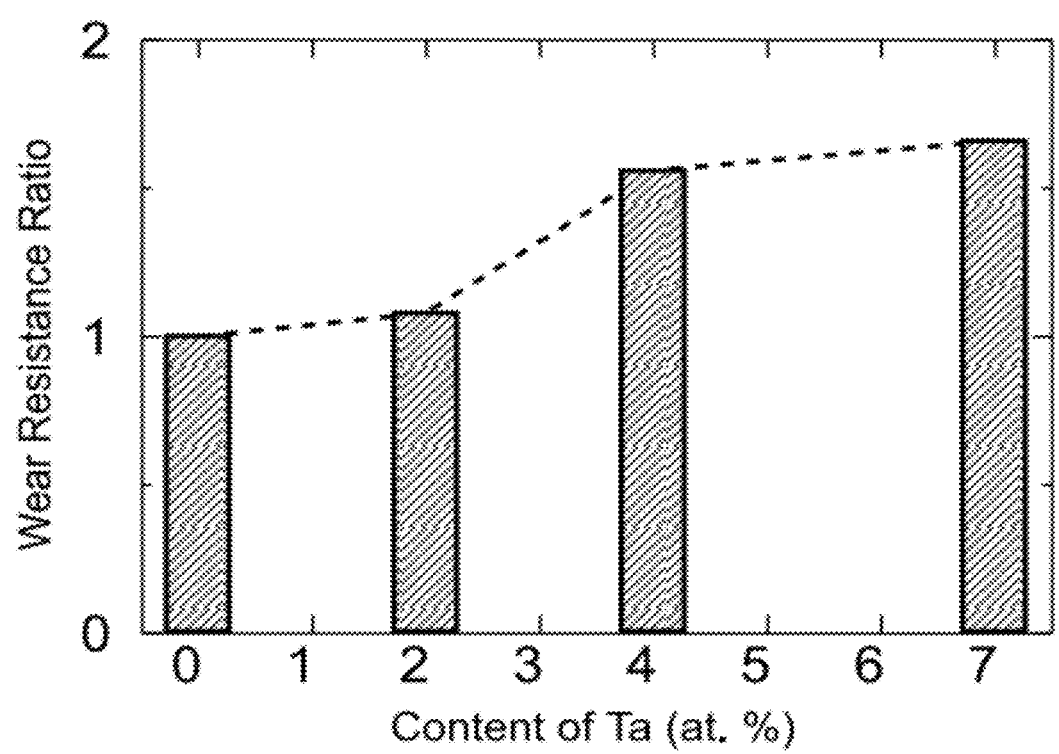
FIG. 16 is a graph showing the wear resistance ratio of Comparative Example Sample, and Example Samples 2, 4 and 7, wherein the wear resistance ratio of Comparative Example Sample is 1.

In addition, FIG. 16 shows the results of the wear resistance ratio in Table 8. FIG. 16 is a graph showing the wear resistance ratio of each sample. Here, the wear resistance ratio is a reciprocal of a value obtained by dividing the wear volume loss rate of each sample shown in Table 8 by that of Comparative Example Sample, and a larger wear resistance ratio means better wear resistance.

FIG. 16 indicates that addition of Ta to an Ni$_3$(Si, Ti) alloy enhances the wear resistance of the alloy at room temperature. In particular, the wear resistance of the alloy is significantly enhanced when the Ta content is 4 atomic % or more. While the wear resistance of alloys at room temperature is considered largely dependent on the hardness, the results shown in FIG. 16 indicate that change of the wear resistance is significant in a Ta content range of more than 2 atomic % to 4 atomic % or less.

Demonstration Experiment 2 as described above has demonstrated that Example Samples have superior hardness (strength) characteristics to Comparative Example Sample as in the case of Demonstration Experiment 1. Demonstration Experiment 2 has also demonstrated that Example Samples have superior hardness (strength) characteristics to Comparative Example Sample even at high temperatures, and have enhanced tensile strength and oxidation resistance characteristics when having a single-phase microstructure, in particular. It has been further demonstrated that the wear resistance is better when the Ta content is more than 2 atomic %.

INDUSTRIAL APPLICABILITY

The present invention can provide an Ni$_3$(Si, Ti)-based intermetallic compound suitable for frictional parts, because the Ni$_3$(Si, Ti)-based intermetallic compound has excellent hardness at normal temperature and has excellent wear resistance. The present invention can also provide an Ni$_3$(Si, Ti)-based intermetallic compound having excellent characteristics as a mechanical structure, because the Ni$_3$(Si, Ti)-based intermetallic compound of the present invention maintains comparable or superior ductility to conventional Ni$_3$(Si, Ti)-based intermetallic compounds.

In addition, the Ni$_3$(Si, Ti)-based intermetallic compound is very useful for materials of high-temperature machine elements as being capable of maintaining excellent hardness not only at normal temperature but also at high temperatures, and more useful in oxidizing high-temperature environments as having excellent oxidation resistance characteristics.

The invention claimed is:

1. An Ni$_3$(Si, Ti)-based intermetallic compound characterized by consisting of from 10.0 to 12.0% by atom of Si, 1.5% by atom or more but less than 6.5% by atom of Ti, more than 2.0% by atom but 8.0% by atom or less of Ta, a balance made up of Ni excepting impurities, and from 25 to 500 ppm by weight of B with respect to a weight of an intermetallic compound having a composition of 100% by atom in total consisting of the respective amounts of Si, Ti, Ta and Ni, and by having a microstructure composed of an L1$_2$ phase or a microstructure composed of an L1$_2$ phase and a second phase dispersion containing Ni and Ta.

2. The Ni$_3$(Si, Ti)-based intermetallic compound according to claim 1, having a Vickers' hardness of from 410 to 520 in a range of temperature from room temperature to 800° C.

3. The Ni$_3$(Si, Ti)-based intermetallic compound according to claim 1, consisting of from 10.0 to 12.0% by atom of Si, from 1.5 to 5.5% by atom of Ti, from 4.0 to 8.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

4. The Ni$_3$(Si, Ti)-based intermetallic compound according to claim 1, consisting of from 10.0 to 12.0% by atom of Si, 2.5 to 5.5% by atom of Ti, 4.0 to 7.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

5. An Ni$_3$(Si, Ti)-based intermetallic compound characterized by consisting of from 10.0 to 12.0% by atom of Si, 2.5 to 6.5% by atom of Ti, 3.0 to 7.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni, and by having a microstructure composed of an L1$_2$ phase or a microstructure composed of an L1$_2$ phase and a second phase dispersion containing Ni and Ta.

6. The Ni$_3$(Si, Ti)-based intermetallic compound according to claim 5, consisting of from 10.0 to 12.0% by atom of Si, from 9.0 to 11.5% by atom in total of Ti and Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

7. The Ni$_3$(Si, Ti)-based intermetallic compound according to claim 5, having a Vickers' hardness of from 410 to 520 measured under a load of 300 g.

8. The Ni$_3$(Si, Ti)-based intermetallic compound according to claim 1, wherein a maximum content of Ta of the Ni$_3$(Si, Ti)-based intermetallic compound is 6.0% by atom.

9. The Ni$_3$(Si, Ti)-based intermetallic compound according to claim 1, consisting of from 19.0 to 21.5% by atom in total of Si, Ti and Ta, a balance made up of Ni excepting impurities, and from 25 to 500 ppm by weight of B with respect to a weight of an intermetallic compound having a composition of 100% by atom in total consisting of the respective amounts of Si, Ti, Ta and Ni.

10. The Ni$_3$(Si, Ti)-based intermetallic compound according to claim 2, consisting of from 10.0 to 12.0% by atom of Si, from 1.5 to 5.5% by atom of Ti, from 4.0 to 8.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

11. The Ni$_3$(Si, Ti)-based intermetallic compound according to claim 2, consisting of from 10.0 to 12.0% by atom of Si, 2.5 to 5.5% by atom of Ti, 4.0 to 7.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

12. The $Ni_3$(Si, Ti)-based intermetallic compound according to claim 3, consisting of 10.0 to 12.0% by atom of Si, 2.5 to 5.5% by atom of Ti, 4.0 to 7.0% by atom of Ta, a balance made up of Ni excepting impurities, and from 25 to 100 ppm by weight of B with respect to a weight of an intermetallic compound having a composition of 100% by atom in total consisting of the respective amounts of Si, Ti, Ta and Ni.

13. The $Ni_3$(Si, Ti)-based intermetallic compound according to claim 6, having a Vickers' hardness of from 410 to 520 measured under a load of 300 g.

14. The $Ni_3$(Si, Ti)-based intermetallic compound according to claim 2, wherein a maximum content of Ta of the $Ni_3$(Si, Ti)-based intermetallic compound is 6.0% by atom.

15. The $Ni_3$(Si, Ti)-based intermetallic compound according to claim 3, wherein a maximum content of Ta of the $Ni_3$(Si, Ti)-based intermetallic compound is 6.0% by atom.

16. The $Ni_3$(Si, Ti)-based intermetallic compound according to claim 4, wherein a maximum content of Ta of the $Ni_3$(Si, Ti)-based intermetallic compound is 6.0% by atom.

17. The $Ni_3$(Si, Ti)-based intermetallic compound according to claim 5, wherein a maximum content of Ta of the $Ni_3$(Si, Ti)-based intermetallic compound is 6.0% by atom.

18. The $Ni_3$(Si, Ti)-based intermetallic compound according to claim 6, wherein a maximum content of Ta of the $Ni_3$(Si, Ti)-based intermetallic compound is 6.0% by atom.

19. The $Ni_3$(Si, Ti)-based intermetallic compound according to claim 7, wherein a maximum content of Ta of the $Ni_3$(Si, Ti)-based intermetallic compound is 6.0% by atom.

20. The $Ni_3$(Si, Ti)-based intermetallic compound according to claim 2, consisting of from 19.0 to 21.5% by atom in total of Si, Ti and Ta, a balance made up of Ni excepting impurities, and from 25 to 500 ppm by weight of B with respect to a weight of an intermetallic compound having a composition of 100% by atom in total consisting of the respective amounts of Si, Ti, Ta and Ni.

* * * * *